United States Patent [19]

Lewis et al.

[11] Patent Number: 5,388,250
[45] Date of Patent: Feb. 7, 1995

[54] APPARATUS AND METHOD FOR GUARANTEEING STROBE SEPARATION TIMING

[75] Inventors: Thomas F. Lewis, Fort Lauderdale; Stephen P. Thompson, Delray Beach, both of Fla.

[73] Assignee: International Business Machines Corporation, Armonk, N.Y.

[21] Appl. No.: 111,034

[22] Filed: Aug. 24, 1993

Related U.S. Application Data

[63] Continuation of Ser. No. 437,059, Nov. 13, 1989, abandoned.

[51] Int. Cl.⁶ .................. G06F 13/10; G06F 13/42
[52] U.S. Cl. .................. 395/550; 395/250; 364/271; 364/270.6; 364/271.5; 364/271.6; 327/141; 327/172
[58] Field of Search ............ 395/275, 550, 250, 325; 307/266, 267; 340/825.2

[56] References Cited

U.S. PATENT DOCUMENTS

| | | | |
|---|---|---|---|
| 3,587,044 | 6/1971 | Jenkins | 371/62 |
| 3,623,017 | 11/1971 | Lowel et al. | 395/550 |
| 4,050,096 | 9/1977 | Bennett et al. | 395/425 |
| 4,050,097 | 9/1977 | Miu et al. | 395/325 |
| 4,143,418 | 3/1979 | Hodge et al. | 395/250 |
| 4,144,562 | 3/1979 | Cooper | 395/325 |
| 4,164,787 | 8/1979 | Aranguren | 395/425 |
| 4,262,331 | 4/1981 | Freeland et al. | 395/275 |
| 4,476,527 | 10/1984 | Clayton, IV | 395/275 |
| 4,486,832 | 12/1984 | Haubner et al. | 395/550 |
| 4,494,196 | 1/1985 | Greer | 395/275 |
| 4,517,641 | 5/1985 | Pinheiro | 395/275 |
| 4,539,635 | 9/1985 | Boddie et al. | 395/775 |
| 4,769,632 | 9/1988 | Work et al. | 340/701 |
| 4,807,109 | 2/1989 | Farrell et al. | 395/325 |
| 4,851,995 | 7/1989 | Hsu et al. | 395/550 |
| 4,853,847 | 8/1989 | Ohuchi . | |
| 4,855,901 | 8/1989 | Planteline . | |
| 4,888,684 | 12/1989 | Lilja et al. | 395/325 |
| 5,033,001 | 7/1991 | Ibi | 395/550 |
| 5,040,109 | 8/1991 | Bowhill et al. | 395/325 |
| 5,060,239 | 10/1991 | Biscoe et al. | 375/38 |
| 5,125,084 | 6/1992 | Begun et al. | 395/375 |
| 5,151,986 | 9/1992 | Langan et al. | 395/550 |

FOREIGN PATENT DOCUMENTS

| | | |
|---|---|---|
| 0212636 | 3/1987 | European Pat. Off. . |
| 0242879 | 10/1987 | European Pat. Off. . |
| 2183872 | 6/1987 | United Kingdom . |
| WO88/02888 | 4/1988 | WIPO . |

OTHER PUBLICATIONS

Draft Final Data Sheet for "IMS-G 171 High Performance CMOS Colour Look-Up Table": INMOS Corp., P.O. Box 16000, Colorado Springs, Colo. 80936.
IBM Personal System/2 ™ Seminar Proceedings; "Personal System/2 Video": vol. V, No. 4: IBM Corp. (Entry Systems Division), May 1987.

Primary Examiner—Parshotam S. Lall
Assistant Examiner—Krisna Lim
Attorney, Agent, or Firm—Leydig, Voit & Mayer, Ltd.

[57] ABSTRACT

An interface between a central processing unit (CPU) and a peripheral device is provided which ensures compatibility between existing software for the peripheral device and a CPU of any speed. The interface waveshapes read or write strobe signals in a transfer cycle between the peripheral device and the CPU in order to ensure timing parameters of the peripheral device are not violated by fast CPUs. If the waveshaping causes a change in the timing between first and second consecutive read or write strobe signals, the interface provides a wait signal to the CPU for the purpose of instructing it to extend the transfer cycle of the second strobe signal. In the illustrated embodiment, an interface according to the invention is part of a video interface connecting a microprocessor unit (MPU) and a video digital-to-analog converter (video DAC). Writing or reading color data to or from the video DAC occurs by way of the interface of the invention. The MPU is slowed while it writes or reads color data only when it is required to prevent violation of the timing parameters of the video DAC. In this regard, slower MPUs are not penalized by the invention since wait states are inserted into a transfer cycle only when it is necessary to re-space consecutive read or write strobe signals to prevent the violation of timing parameters.

24 Claims, 8 Drawing Sheets

FIG. 3A
COLOR VALUE WRITE FOLLOWED BY ANY WRITE

FIG. 3B
COLOR VALUE WRITE FOLLOWED BY ANY READ

FIG. 3C
COLOR VALUE READ FOLLOWED BY ANY READ

FIG. 3D
COLOR VALUE READ FOLLOWED BY ANY WRITE

FIG. 3E
DATA TRANSFERRED

APPARATUS AND METHOD FOR GUARANTEEING STROBE SEPARATION TIMING

This is a continuation of copending U.S. application Ser. No. 07/437,059, filed on Nov. 13, 1989, now abandoned.

TECHNICAL FIELD

The invention generally relates to the design of computer systems and more particularly relates to the interfacing of central processing units and peripheral devices such as input/output and memory devices.

BACKGROUND

Typically, in a computer system, communication between a central processing unit such as a microprocessor (MPU) and a peripheral device occurs in connection with data transfer cycles. In interfacing an MPU and a peripheral device timing is an important consideration. Examples of two critical timing parameters are read and write access times. These are the times needed for internal address decoders to locate the correct byte in memory. To accommodate these access times, it is well known to make wait states part of the nominal transfer cycle. Also, a handshake protocol between the MPU and the peripheral device is commonly employed to insert additional wait states into the transfer cycle in order to ensure a particular peripheral device has available to it the needed access time. For this purpose, most MPUs include a READY input which when deactivated serves to add wait states to a transfer cycle up to some predetermined maximum number of consecutive states.

Other timing parameters are, of course, associated with the transfer of data between an MPU and peripheral during a transfer cycle. Historically, however, these other timing parameters have not required special consideration in large part because they were typically not of the same order of magnitude as the nominal time period of the transfer cycle. Therefore, special precautions to prevent violation of these parameters has not been necessary.

Special situations exist, however, where a peripheral device is characterized by a timing parameter that is of the same order of magnitude as the transfer cycle. For example, in the video subsystem of an IBM Personal System/2 TM model 50, 60 or 80, a digital-to-analog converter (DAC) contains a color look-up table (CLUT) which allows eight (8) bit pixel valves to be translated into six (6) bit red, green and blue components before the digital-to-analog conversion takes place, allowing up to 256 colors out of a possible 256K colors to be displayed. The CLUT can be written to and read from the MPU by its performing write and read commands to certain input/output (I/O) addresses. One of the timing parameters of the video DAC places a limitation on how soon the leading edge of a read or write strobe can occur after the trailing edge of a previous read or write strobe. This timing parameter is related to the asynchronous relationship between the pixel stream and the system clock. In order to ensure the pixel stream is not disrupted during a read or write command, the timing parameter requires up to six (6) pixel or dot clocks (e.g., 480 nanoseconds) as a minimum separation between the trailing edge of one signal and the leading edge of the next.

With increasingly faster microprocessors, instruction and transfer cycle times have decreased dramatically. With these increasing microprocessor speeds, timing parameters of peripheral devices such as that of the aforementioned video DAC are violated unless software delays are inserted between consecutive transfer cycles. These software delays, however, may not continue to be effective as machine speeds continue to increase and operating systems become more sophisticated.

DISCLOSURE OF THE INVENTION

It is a primary object of the invention to ensure compatibility between existing software and new hardware systems having system clocks running at speeds significantly faster than the system clocks of the hardware for which the software was originally designed. It is a related object of the invention to provide a computer system that can be programmed free of any considerations concerning the relative speeds of the central processing unit (CPU) and a peripheral.

It is another object of the invention to allow a CPU in a computer system to operate at its fastest speeds while also ensuring the CPU reliably communicates with slower peripheral devices.

It is a more detailed object of the invention to optimize the speed of communications between a CPU and a peripheral device without violating timing parameters of the device (e.g., the command precharge time). It is a related detailed object of the invention to provide an apparatus in a computer system which slows instruction cycles of a CPU only when necessary to prevent violation of timing parameters in a peripheral device.

It is also a detailed object of the invention to selectively extend the nominal instruction cycles of the CPU without imposing a performance penalty on slower CPUs or software having programmed delays.

In accordance with the foregoing objects, in a device having at least one input for receiving signals from a central processing unit (CPU), the invention provides an apparatus and method independent of the CPU for waveshaping signals to the device input such that any two consecutive signals are always separated by a predetermined time period. By separating the signals, a second signal is not received before processing of the first is complete, thereby ensuring the device's specifications are not violated by the generation of consecutive signals to the input of the device. By waveshaping the input signals, a second signal for the device generated by the CPU within the predetermined time periods is effectively delayed and only received by the device after expiration of the predetermined time period. In order to account for the delayed receipt of the second signal, the apparatus also provides for sensing the presentation of the signal to the device by the CPU during the predetermined time period and, in response thereto, generating a signal for the CPU instructing it to extend the instruction or transfer cycle associated with the second signal in order to accommodate the delayed receipt of the signal by the device. In the foregoing manner, the CPU is slowed only in response to the occurrence of an actual condition (i.e., consecutive signals too close) which could possibly cause an unknown condition at the device.

Preferably, the apparatus and method of the invention extend the instruction or transfer cycle associated with the second signal by an amount approximately equal to the delay of the signal being received by the device. In this regard, because the delay is asynchronous with respect to the system clock, the extended cycle is also asynchronous.

More particularly, the invention provides an interface between a CPU and a peripheral device comprising a gate for receiving read or write strobe signals from the CPU and passing the signals on to the peripheral device in a metered manner, meaning consecutive signals are separated by at least a predetermined time interval. The gate achieves this function in cooperation with a first group of circuitry which disables the gate for the predetermined time period following the passing of a first read or write strobe through the gate and to the peripheral device. A second group of circuitry in the interface senses the occurrence of a second read or write strobe during the time the gate is disabled and, in response thereto, provides a wait signal to the CPU for the purpose of instructing the MPU to extend the instruction or transfer cycle associated with the second read or write strobe.

The apparatus and method of the invention extend an instruction or transfer cycle only when necessary and only by an amount necessary to ensure timing parameters of the device are not violated. While ensuring reliable completion of instruction and/or transfer cycles, the invention also allows the CPU to run at its fastest speeds and only slows execution of a cycle when needed. No performance penalty is imposed on slower CPUs since their cycles will be extended only if required to ensure timing parameters are not violated. Similarly, software including programmed delays is not penalized.

In its preferred embodiment, applicants employ the invention in a video subsystem of a personal computer. Specifically, the preferred embodiment illustrated and described in detail hereafter incorporates the invention in a video interface of a video subsystem in order to provide an interface between a microprocessor unit (MPU) of the personal computer and a video digital-to-analog converter (DAC). As previously mentioned, a timing parameter of the video DAC demands a minimum separation time between the trailing edge of a first read or write strobe signal and the leading edge of the next read or write strobe signal. In this preferred embodiment, the invention ensures this parameter is met while only extending transfer cycles between the video DAC and the MPU when necessary to avoid violation of the parameter.

Although applicants have hereinafter described their invention in a video system, it will be appreciated and understood by those skilled in the art of designing computer systems and in particular interfaces between peripheral devices and CPUs that the invention has much broader application and is not intended to be limited to only video subsystems.

DETAILED DESCRIPTION OF THE PREFERRED EMBODIMENT

Turning to the drawings and referring first to FIGS. 1 and 2A-2C, a computer system is illustrated incorporating an exemplary video subsystem having a video interface 11, a bit map memory 13, a video digital-to-analog converter (DAC) 15 and, of course, a raster scan display unit such as a color cathode ray tube (CRT) 17. In a conventional manner, a central processor in the form of a system controlling microprocessor (MPU) 19 communicates with the video subsystem along a three-state system bus 21. The three-state system bus 21 is interfaced to the video subsystem by a bus interface 23 of well-known design. From the bus interface 23, address and data buses 25 and 27, respectively, and control lines 29 are fed to the video interface 11 and the video DAC 15. Within the video interface 11 and the video DAC 15 are registers that are read from or written to by the MPU 19 as explained more fully hereinafter.

Figure 1:
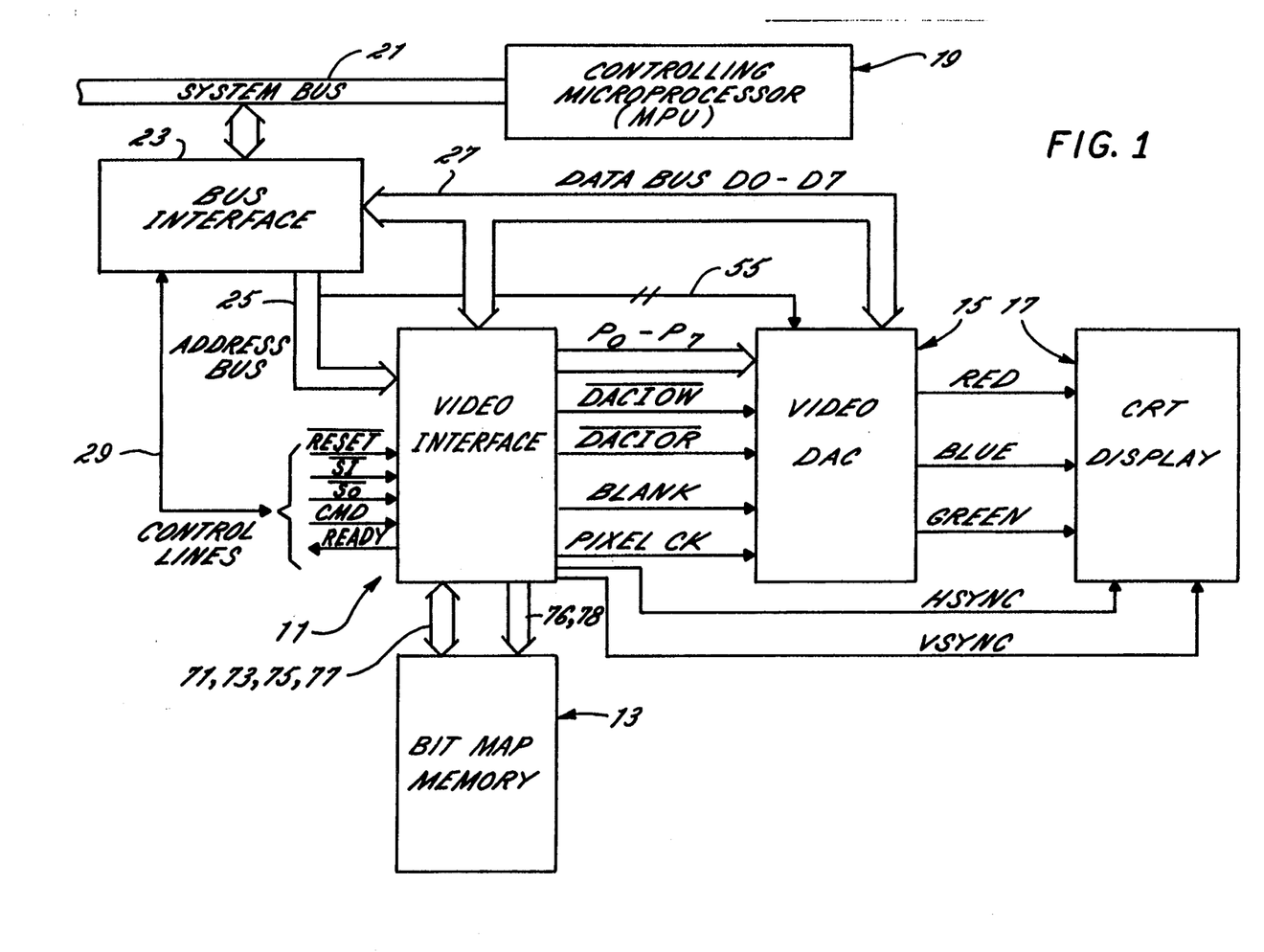
FIG. 1 is a block diagram of an exemplary video subsystem of a computer system incorporating the present invention.

The video DAC 15 is a color graphics controller which generates electrical signal values for respective color inputs to the color CRT 17 in response to a succession of pixel values derived from the bit map memory 13 which stores pixel values for a scanning sequence. The video DAC 15 includes a color look-up table (CLUT) 31 which is arranged to receive 8-bit pixel values $P_0$-$P_7$ on an 8-bit pixel bus 33 from the bit map memory 13 via the video interface 11 at a pixel frequency determined by a pixel clock (PIXEL CK). The CLUT 31 and a group of digital-to-analog converters (DACs) 35 convert the pixel values into analog electrical signals on output lines 37, 39 and 41 which are connected respectively to the red, blue and green guns of the color CRT 17. The CLUT 31 comprises a RAM memory which is used to look up a color value for each of the pixel values received from the bit map memory 13. In other words, the contents of the pixel do not directly drive the DACs 35 of the video DAC 15; instead, they are addresses for color data stored in the CLUT 31. The MPU 19 controls the color values stored in the CLUT 31 for each of the 256 possible pixel values contained in the bit map memory 13.

Referring more specifically to the production of analog color signals from pixel data, the CLUT 31 of the video DAC 15 has 256 addressable locations, each holding an 18-bit word representing a color value. Pixel values are supplied on the pixel bus 33 at the pixel frequency determined by the pixel clock. Each pixel value is an 8-bit pixel word which is stored in a pixel latch 42 and used as an address into the 256 color value locations of the CLUT 31. Each pixel value causes an 18-bit wide data value to be supplied to a bus 43 from the CLUT 31 to a decoder 45. The 18-bit data value is composed of three groups of six bits each representing an intensity value for red, blue or green, respectively, and is fed to a corresponding one of the DACs 35 through the decoder 45. Thus, the 18 bits of a data value can indicate any of 262,144 combinations of color intensity values of red, blue and green. In this way, each pixel value chooses one of 256 color values held in the CLUT 31. A timing generator 47 in the video DAC 15 controls the timing operation of the CLUT 31, decoder 45 and DACs 35 so that analog output signals are supplied on lines 37, 39 and 41 at the same pixel frequency. Also, a conventional $\overline{BLANK}$ signal from the video interface 11 causes the DACs 35 to drive their outputs to zero during the retracing of the CRT's raster.

In order to take full advantage of the number of possible color combinations available, the MPU 19 can write different color values into one or more locations of the CLUT 31 through the data bus 27 by use of an MPU interface 49. In this way, the 256 locations in the CLUT 31 can be used to form a color palette which by use of the MPU 19 and the MPU interface 49 can select 256 different combinations of red, blue and green, each such combination being one of 262,144 different colors. The MPU 19 can also read different color values from the CLUT 31. In this manner, one palette may be momentarily substituted for another and thereafter the first may be returned. Such a transfer of palette data typically occurs in a multi-tasking environment when control of the screen image is transferred between programs being executed. Not all presently available video DACs provide the capability for reading from the CLUT 31. In this regard, applicants prefer an IMS-G 171 video DAC manufactured by INMOS Corp. of P.O. Box 16000, Colorado Springs, Colo. 80936 since it allows data to be both read from and written to the CLUT.

In order to provide for operation at a high pixel frequency, a fast cycle time in the aforementioned INMOS video DAC is achieved by using a pipelined data access technique so that address decoding for the CLUT 31 and reading and writing of data from and to the memory cells in the CLUT are each completed as a multi-stage operation over two pixel clock cycles. In the illustrated video DAC 15, the MPU interface 49 simplifies communication between the video DAC and the MPU 19 and is totally asynchronous to the pipeline pixel clock.

Inside the INMOS video DAC and as illustrated in FIG. 2B, an 8-bit address bus 51, connecting the pixel bus 33 from the bit map memory 13 to the CLUT 31, is joined to an address bus 53 from the MPU interface 49, the latter for providing 8-bit addresses for read and write transfer cycles between the CLUT and the MPU 19. In response to a pixel value on the address bus 51, the CLUT 31 determines the storage state of the accessed memory cells. Alternatively, a memory cell of the CLUT 31 identified by an address on bus 53 may be read from or written to by the MPU 19 via the MPU interface 49.

Turning for a moment to a more detailed discussion of reading from or writing to memory cell addresses, the MPU 19 and the MPU interface 49 of the video DAC 15 communicates by way of the data bus 27 (FIG. 1) and the video interface 11. The video interface 11 receives conventional control lines such as status control S0 and S1, command control line CMD and a $\overline{RESET}$ control line shown in FIG. 1 and derives read and write strobe signals $\overline{DACIOR}$ and $\overline{DACIOW}$, respectively, which are delivered to the MPU interface 49 of the video DAC 15. When a $\overline{DACIOW}$ strobe signal command is generated, the MPU interface 49 receives on the eight data lines D0–D7 of the data bus 27 four successive 8-bit bytes representing an address location and the red, blue and green color values. When the four bytes have been loaded into internal registers (not shown), the MPU interface 49 controls the transfer of the color data so that at the beginning of a new pipelined pixel cycle, a writing operation is carried out at the address indicated.

Specifically, changing a color stored in the CLUT 31 is a multi-step process requiring read and/or write transfer cycles have a plurality of transfer cycles. First, the starting pixel address must be specified while the video DAC 15 is in a write mode ($\overline{S0}+\overline{S1}=\overline{IOW}=0$). The MPU interface 49 stores this address in a pixel-address register identified by the two least significant bits 55 of the address bus 25. The following three separate data words for the red, blue and green color-definition data are collected in color-value registers also identified by the bits 55 and concatenated into an 18-bit word. The MPU interface 49 then points to the memory cell to be changed by presenting the data in the address register onto the address bus and transfers the 18-bit concatenated word onto an 18-bit data bus 57 in synchronization with the pixel clock.

Figure 3A:
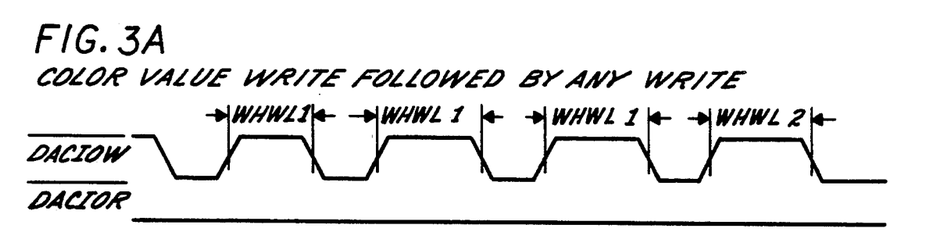
FIGS. 3A, 3B, 3C, 3D, and 3E are timing diagrams illustrating the timing relationship between consecutive read/write strobe signals in an instruction for writing or reading color data to or from the video DAC.
Figure 3B:
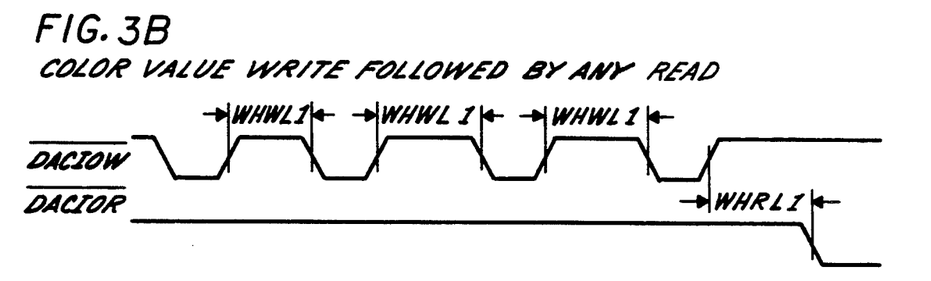
Figure 3C:
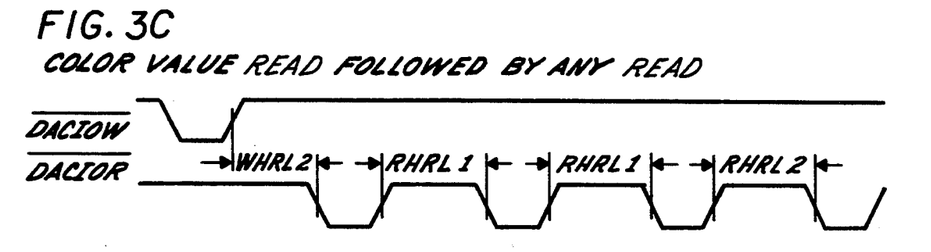
Figure 3D:
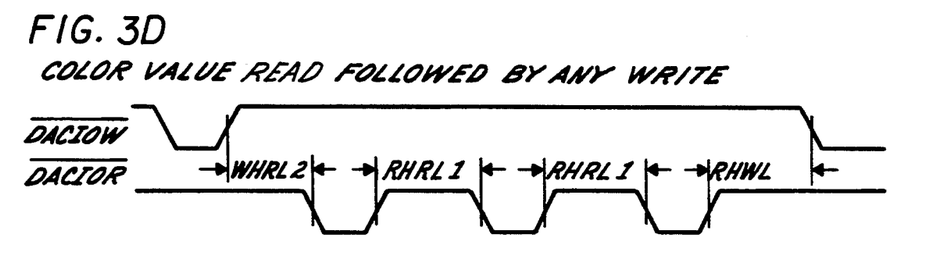
Figure 3E:
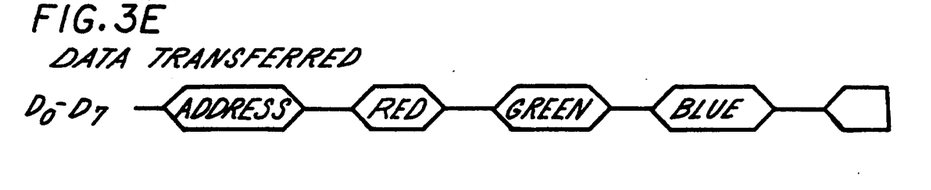

FIGS. 3A, 3B and 3C illustrate four (4) possible timing situations which can occur when the MPU 19 writes data to or reads data from the CLUT 31. FIGS. 3A and 3B illustrate a write instruction followed by a read/-write strobe signal of any following transfer cycle, and FIGS. 3C and 3D illustrate the same for a read instruction. Specifically, in FIG. 3A, the write instruction comprises 4 write transfer cycles and is followed by a write strobe signal from any type of transfer cycle between the MPU 19 and the video DAC 15. In FIG. 3B, the write instruction is followed by a read strobe signal from any type of read transfer cycle. Similarly, the read instruction of FIG. 3C comprises one write and three read transfer cycles and is followed by any type of read transfer cycle between the MPU 19 and the video DAC 15; whereas, FIG. 3D illustrates any type of write transfer cycle following the read instruction. Finally, FIG. 3E indicates the status of the data lines D0–D7 of the data bus 27 during either the read or write instruction. Address data is transferred onto the data lines D0–D7 by the MPU 19 during the first transfer cycle, which is a write cycle for both read and write instructions. Next, the color data follows onto the data lines $D_0$–$D_7$ in three sequential bytes. Each of the three color bytes are associated with the three write or read transfer cycles following the initial write transfer cycle. The color bytes are placed onto the data lines by either the MPU 19 or the video DAC 15, depending on whether a read or write instruction is being executed.

Referring specifically to FIG. 3A, four write transfer cycles to the video DAC 15 cause a CLUT address location to be written into the pixel address register (not shown) in the MPU interface 49 and three sets of color data for red, green and blue to be written into the color-value registers (also not shown). As can be seen from Table 1, the trailing edge of each write signal in the write instruction of FIG. 3A must be separated from the leading edge of a following write strobe signal by an amount WHWL1. Table 1 indicates this amount must be at least three (3) pixel clock periods. This timing constraint allows the execution of the transfer cycle which is asynchronous with respect to the flow of pixel information to the color CRT 17 without disrupting the CRT image. FIG. 3A also shows a timing parameter between the rising edge of the write signal for the blue color data and the falling edge for a write signal for any following instruction. This timing parameter is designated as WHWL2 and, as indicated in Table 1, must be at least six (6) pixel clock cycles.

Like FIG. 3A, FIG. 3B illustrates a series of write strobe signals for executing a write instruction to the CLUT 31. Unlike FIG. 3A, however, the rising edge of the last write signal for transferring the new color data into the CLUT 31 is followed by the falling edge of a read strobe signal in any type of following instruction to the video DAC 15. There is a minimum time period between the rising edge of this last write strobe signal and the falling edge of the read strobe signal, and it is indicated as WHRL1 in FIG. 3B. From Table 1, it can be seen that this timing parameter must be at least six (6) pixel clock cycles.

TABLE 1

| TRANSITIONS | | PIXEL CLKS |
| --- | --- | --- |
| WHWL1 | (write/high to write/low) | 3 |
| WHWL2 | (write/high to any write/low) | 3 |
| WHRL1 | (write/high to any read/low) | 6 |
| WHRL2 | (write/high to read/low) | 3 |
| RHRL1 | (read/high to read/low) | 3 |
| RHRL2 | (read/high to any read/low) | 6 |
| RHWL | (read/high to write/low) | 6 |

FIG. 3C illustrates a sequence of write and read strobe signals associated with four (4) transfer cycles of a read instruction for reading a memory cell location from the CLUT 31. Three different timing parameters are illustrated. First, the separation WHRL2 between the write signal for the address to be read and the first read strobe signal for the color red data is three (3) pixel clock cycles as indicated in Table 1. The separation RHRL1 between read signals for reading the color data is three (3) pixel clock pulses. Finally, the minimum time between the trailing edge of the last color read signal and the falling edge of a read strobe signal from any type of following instruction to the video DAC 15 is designated as RHRL2, and Table 1 indicates it has a minimum value of six (6) pixel clock cycles.

FIG. 3D illustrates the same read instruction to the video DAC 15 as shown in FIG. 3C. However, a timing parameter RHWL following the trailing edge of the last color read strobe signal indicates that the leading edge of any write strobe signal following the trailing edge of the last color read must be separated by at least six (6) pixel clock cycles as indicated in Table 1.

Figure 2A:
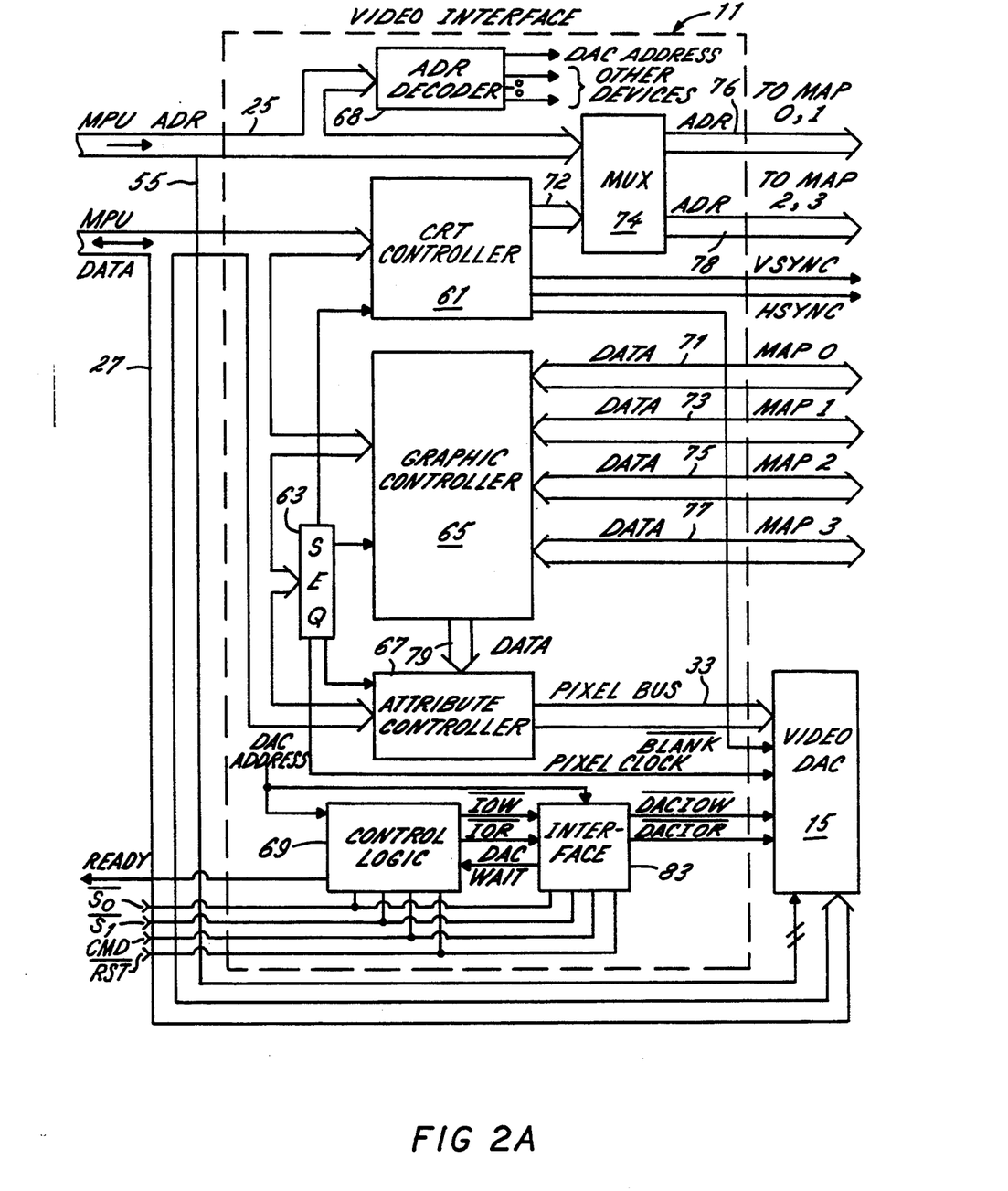
FIGS. 2A and 2B are block diagrams of a video interface and video digital-to-analog converter (DAC) which are two major components of the video subsystem shown in FIG. 1.
Figure 2B:
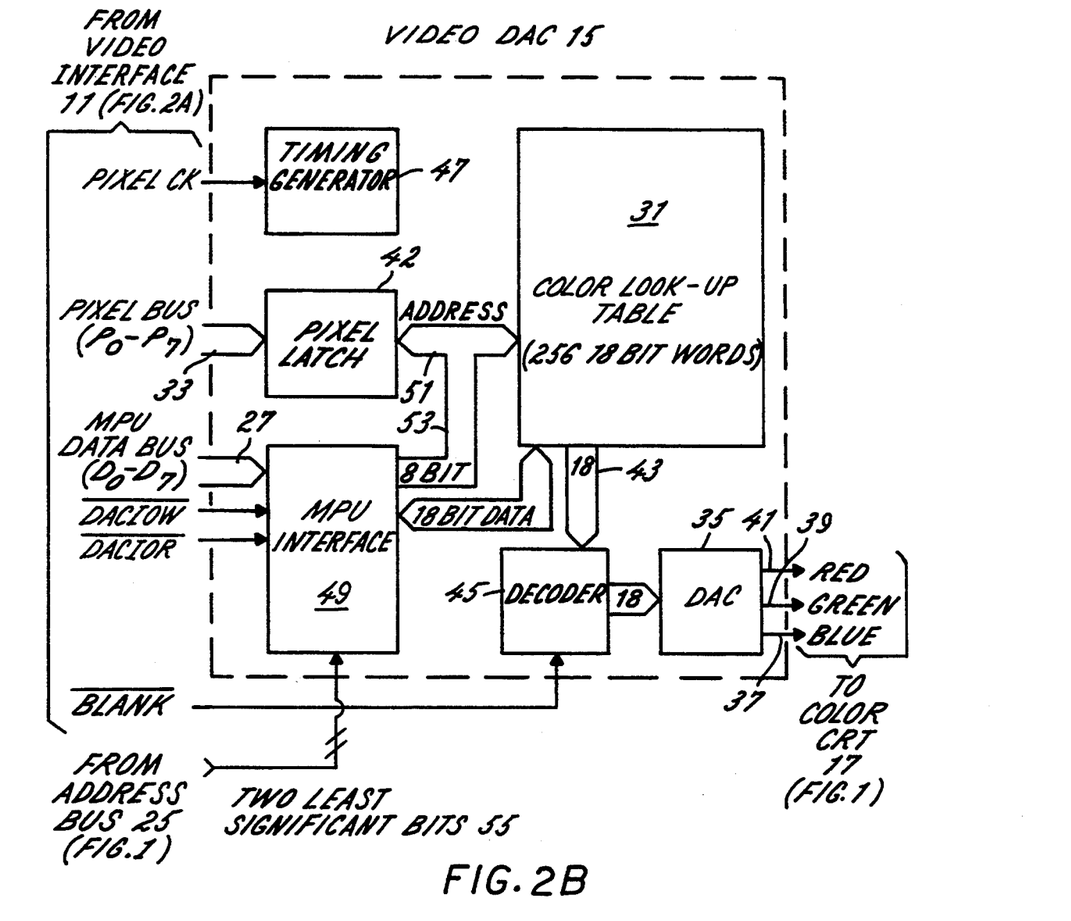

Turning to the video interface 11, it is shown in FIG. 2A comprising its major component parts. It is for the most part conventional in design, being substantially similar to the IBM video graphics array (VGA) found in the IBM Personal System/2 TM models 50 and 60. The video interface incorporates five (5) major components as illustrated; they are a CRT controller 61, a sequencer 63, a graphics controller 65, an attribute controller 67, an address decoder 68 and control logic 69. The CRT controller 61 generates horizontal and vertical synchronous timing (HSYNC, VSYNC and BLANK) and refresh addressing by way of address bus 72 for the dynamic RAMs of the bit map memory 13. In a manner well known in the art, the bit map memory 13 is divided into four bit plane maps 0-3. MAP0 is the blue bit plane, MAP1 is the green bit plane, MAP2 is the red bit plane and MAP3 is the intensity bit plane. For writing to or reading from the bit map memory 13, data is received from the address bus 25 by a multiplexer (MUX) 74 and directed to the address buses 76 and 78 for maps 0-3. Alternatively, during normal active display times, address data from the CRT controller 61 is delivered to the address buses 76 and 78 via the bus 72 and MUX 74.

The sequencer 63 generates basic memory timings for the bit map memory 13 and the pixel clock for controlling regenerative memory fetches. It also allows the MPU 19 to access the bit map memory 13 during active display intervals by inserting dedicated MPU cycles periodically between the display memory cycles.

The graphics controller 65 is the interface between the video data contained in the bit map memory 13 and 1) the attribute controller 67 during active display times and 2) the MPU 19 during its execution of read or write instructions to the bit map memory 13. During display times, video data from data buses 71, 73, 75 and 77 (MAP0, MAP1, MAP2, MAP3) is latched by the graphics controller 65 and sent to the attribute controller 67 by way of a data bus 79. When the MPU 19 writes or reads video data, the graphics controller 65 performs logical operations on the data before it reaches the bit map memory 13 or the system data bus 21. The attribute controller 67 takes in data from the bit map memory 13 via the graphics controller 65 and formats it for display on the display screen of the CRT 17. Data incoming is converted to an 8-bit output digital color value or pixel and presented on the 8-bit pixel bus 33 which delivers the pixel data $P_0$–$P_7$ to the video DAC 15, where it is used as an address into the CLUT 31 as previously discussed.

In order for the MPU 19 to write to or read from the video DAC 15, the DAC address is decoded at the address decoder 68 and a DAC ADDRESS signal is applied to the control logic 69 and an interface 83. To generate read/write signals and to control the flow of data, control signals of the control lines 29 are received by the video interface 11 at the logic control 69. In a conventional manner, read or write signals $\overline{IOR}$ or $\overline{IOW}$ are generated by the video interface 11 in response to signals on the control lines such as the status strobe signals on the lines $\overline{S0}$ and $\overline{S1}$ and the command strobe signal on the line CMD.

In existing video interfaces, such as the aforementioned IBM VGA, the $\overline{IOR}$ and $\overline{IOW}$ signals are directly applied to the read and write inputs of the video DAC 15. As discussed in connection with FIGS. 3A–3C and Table 1, however, consecutive read or write strobe signals to the video DAC 15 must satisfy certain timing constraints concerning how close a leading edge of one signal may follow the falling edge of another. Generally, these timing constraints relate to the precharge time of the video DAC 15, meaning the time required by the device to prepare for receiving a read or write strobe signal after receipt of a previous read or write strobe signal. These timing demands have in the past been satisfied by inserting a software delay so that at least several machine cycles separate consecutive transfer cycles in a read or write instruction. However, such software delays do not ensure portability in the face of ever increasing processor speeds and may in fact fail to maintain the required timing separation if such software-delayed read and write instructions are executed by high-speed computer systems and/or sophisticated operating systems.

In accordance with the invention, the control logic 69 of the video interface 11 is supplemented by the interface circuitry 83 positioned between the control circuitry and the read and write inputs to the video DAC 15 for masking the inputs for a predetermined time period after the video DAC has received a read or write strobe signal. By masking the inputs, the invention ensures that the timing parameters of FIG. 3 and Table 1 are not violated. If a second read or write strobe signal ($\overline{IOR}$ or $\overline{IOW}$) to the video DAC 15 is generated while the read and write inputs to the video DAC are masked following receipt of a first read or write strobe signal, the interface circuitry 83 according to the invention provides a DAC WAIT signal to the control logic 69. In response to this DAC WAIT signal, the control logic 69 releases a READY line connected in a conventional manner to a READY input of the MPU 19, thereby causing the signal to go inactive and the MPU to insert wait states into the transfer cycle associated with the second read or write strobe signal.

Figure 4A:
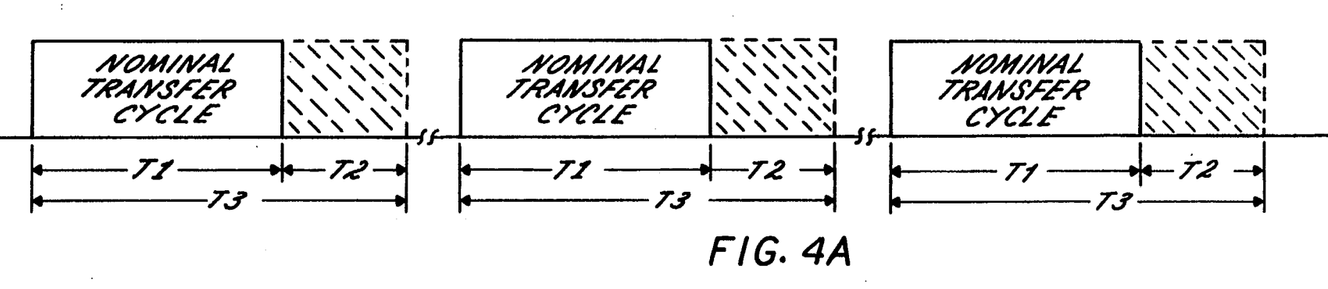
FIGS. 4A, 4B, and 4C are schematic timing diagrams illustrating three possible sequences of transfer cycles between a central processing unit in the form of a controlling microprocessor (MPU) and the video subsystem in accordance with the invention.
Figure 4B:
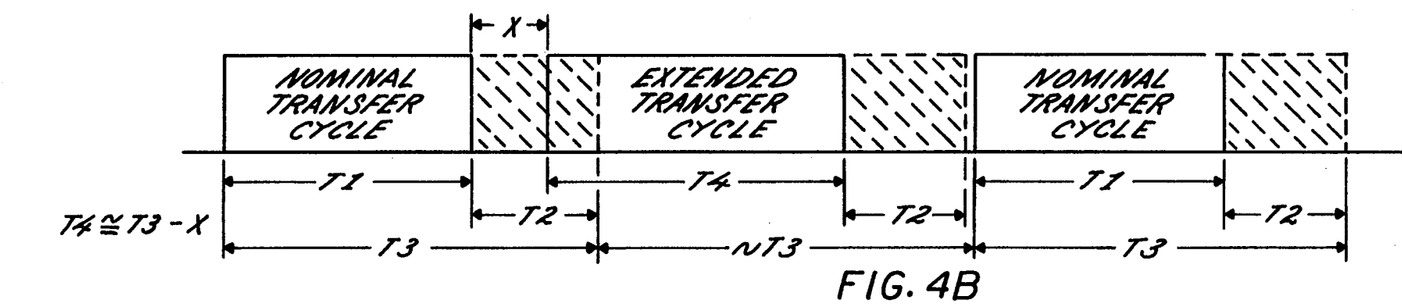
Figure 4C:
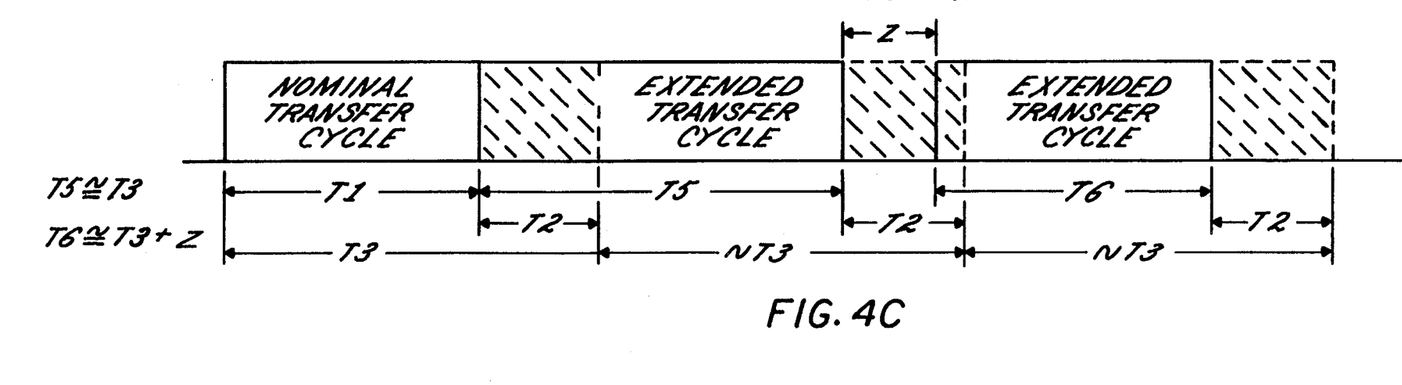

Referring to FIGS. 4A, 4B and 4C, an exemplary instruction is shown comprising three transfer cycles. In keeping with the invention, when a second transfer cycle too closely follows a first, the second is executed over a time period which is extended relative to a nominal time period T1 for the transfer cycle. The phrase "nominal transfer cycle" is intended to define the approximate time period for a transfer cycle having only the minimum number of machine cycles necessary to execute the transfer. Following each transfer cycle illustrated in FIGS. 4A–4C is a shaded area for indicating an approximate time period T2 which when taken with the nominal time period T1 corresponds to the response time period required by the peripheral device receiving the instruction. In the video DAC 15 having the timing parameters illustrated in FIGS. 3A–3E, for example, the time period T2 is the time required for the video DAC to pre-charge between the end of one read/write strobe and the beginning of another, assuming the end of a read/write strobe corresponds approximately to the end of a transfer cycle. Although the MPU 19 is released to execute another transfer cycle (possibly for an unrelated instruction) at the end of the nominal transfer cycle T1 as schematically shown by each of the first transfer cycles in FIGS. 4A–4C, the effective transfer cycle for the peripheral device is T1+T2 since the time T2 is needed by the device to complete its response.

When all of the transfer cycles of an instruction are separated from one another by a relatively large time period such as suggested by the instruction of FIG. 4A, each transfer cycle is characterized by a nominal cycle, thereby allowing the MPU 19 to execute the instruction at its optimum speed. When consecutive transfer cycles are closely spaced as are the first and second transfer cycles in FIG. 4B, the MPU 19 is effectively slowed by extending the second transfer cycle in order to ensure the device has sufficient time for responding to the instruction. Specifically, in FIG. 4B the second transfer cycle begins at a time X after the end of the first transfer cycle, where X is less than T2. To ensure the peripheral device has the full time T3 required by it to respond to the first transfer cycle, the invention effectively delays execution of the second transfer cycle by masking the read/write input for a predetermined time period and also extends the second cycle in order to compensate for the delay.

Similar to the extended cycle in FIG. 4B, the second transfer cycle in the instruction of FIG. 4C is extended since the cycle begins essentially immediately after the completion of the first nominal transfer cycle. In keeping with the invention, the extended transfer cycles are extended by only an amount necessary to compensate for the delay in execution during the first portion of the transfer cycle. Therefore, only the minimum number of wait state machine cycles are inserted into the extended transfer cycle. Accordingly, system throughput is minimally effected by the invention. In the particular example of the second and extended transfer cycles of FIGS. 4B and 4C, the second transfer cycle of FIG. 4B is only extended by a number of machine cycles which approximate the required delay (T2−X) and for the second transfer cycle of FIG. 4C the number of inserted machine cycles correspond approximately to the delay which is the full time period T2.

Finally, in order to illustrate the possible sequence of transfer cycles in the exemplary instruction of FIGS. 4A–4C, the third transfer cycles in FIGS. 4B and 4C are illustrated as having different spaced relationships with respect to the second and extended transfer cycles. Specifically, the third transfer cycle of the instruction in FIG. 4B is characterized by a nominal time period since it follows more than a time period T2 after the end of the second and extended transfer cycle. In contrast to the third transfer cycle in the instruction of FIG. 4B, the third transfer cycle in the instruction of FIG. 4C begins before the end of the time period T2 following the second and extended transfer cycle. Therefore, the third transfer cycle in the instruction of FIG. 4C is extended in the same manner as the second transfer cycles of FIGS. 4B–4C. Specifically, the third transfer cycle begins after a time period Z after the end of the second extended transfer cycle, where Z is less than T2. In order to accommodate the delay in execution of the third transfer cycle, it is extended by a number of machine cycles which approximate the time period T2−Z.

Since the timing parameter T2 is intended to separate consecutive read/write signals of consecutive transfer cycles and not the cycles per se, it will be appreciated that slower CPUs may in fact have nominal transfer cycles which result in the desired separation time T2 between consecutive read/write signals regardless of how closely one cycle follows another. For these CPUs, the invention imposes no penalty since the cycles are not extended because the time T2 is measured from the trailing edge of the signal and not the end of the transfer cycle. As indicated above, however, the beginnings and ends of the read/write strobe signals are assumed for purposes of illustration in FIGS. 4A–4C to correspond to the beginnings and ends of the cycles.

As can be seen from an inspection of the schematic transfer cycles in FIGS. 4A–4C, the overall time period for an instruction is three (T3) regardless of the precise nature of the overlapping between transfery cycles in an instruction. Specifically, an extended transfer cycle is approximately equal to the nominal time period T1 plus the overlap time period (T2−X, T2 or T2−Z in FIGS. 4B–4C). By extending cycles only to the degree required to compensate for the delay, the overall instruction time period remains approximately unaffected. However, the extended cycle plus the trailing time period T2 is only approximately equal to the time period T3 of the nominal transfer cycle plus the trailing time period T2 since as previously mentioned the extended transfer cycle is asynchronous with respect to the system clock. Referring to the drawings, in FIG. 4B the second cycle is extended and has a time period T4 approximately equal to T1+(T2−X) or T3−X. The second cycle of FIG. 4C has an extended time period of T5 approximately equal to T1+T2 or T3, and the third cycle of FIG. 4C is extended to have a time period of T6 approximately equal to T1+(T2−Z) or T3−Z.

In a conventional manner, the MPU 19 reacts to the deactivation of the READY line by executing wait state machine cycles until the READY signal goes active again. Referring to the flow diagram of FIG. 5 in this regard, the microcode of the MPU 19 fetches an instruction in step A which in this case is a read/write instruction to the video DAC 15. A nominal transfer cycle is executed according to steps B, C and D unless the READY line goes inactive. If the READY line goes inactive, the MPU 19 executes a wait state cycle in step E and then returns to execution of the nominal cycle. The MPU 19 continues to execute the loop of steps B and E until the READY line returns to active.

Figure 6:
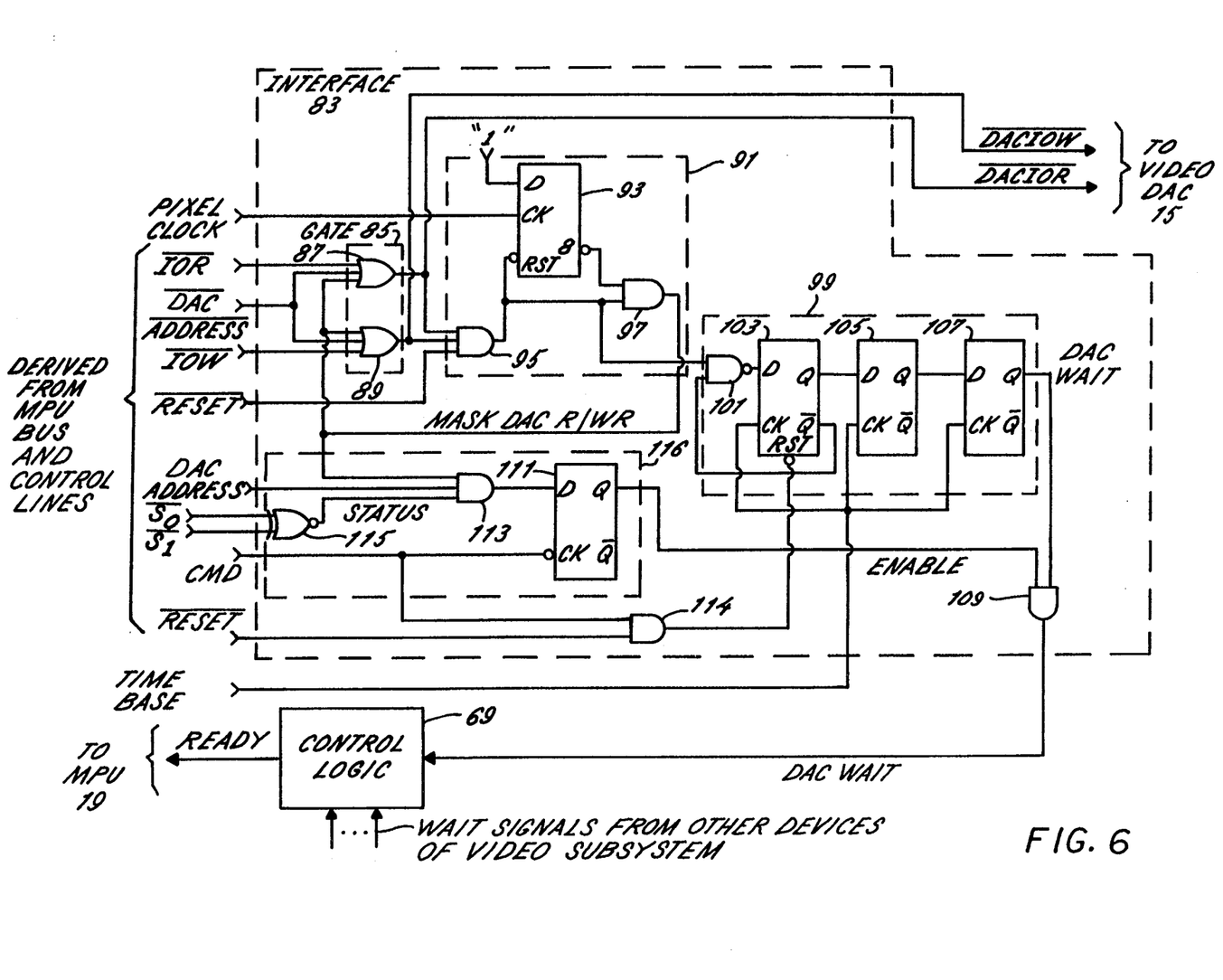
FIG. 6 is a circuit diagram of an interface incorporated into the video interface of FIG. 2A for implementing the invention in accordance with a preferred embodiment.

Turning to FIG. 6, a detailed schematic diagram of the preferred embodiment of the interface 83 (FIG. 2A) of the invention is illustrated. Functionally, the interface 83 includes a gate 85 for metering the passage of read and write signals $\overline{IOR}$ and $\overline{IOW}$ to the video DAC 15. By metering the $\overline{IOR}$ and $\overline{IOW}$ signals through the gate 85, they are waveshaped into read and write signals $\overline{DACIOR}$ and $\overline{DACIOW}$, respectively. The gate 85 comprises two OR gates 87 and 89. A means 91 for selectively disabling the OR gates 87 and 89 is provided by a binary counter 93 and AND gates 95 and 97. Upon detection at the outputs of either OR gates 87 or 89 of a read or write strobe signal, a MASK DAC R/WR line goes active, thereby disabling the OR gates 87 and 89 and preventing passage of any further read or write strobe signals.

A sample and delay circuit 99 comprising NAND gate 101 and D flip-flops 103, 105 and 107 provide a signal DAC WAIT which indicates when a read or write strobe signal ($\overline{IOR}/\overline{IOW}$) has been received by the video DAC 15. This DAC WAIT signal is passed on to a wait state generator comprising an AND gate 109 and the control logic 69. When successive read or write strobe signals $\overline{IOR}$ or $\overline{IOW}$ are presented to the OR gates 87 or 89 separated by a predetermined time period greater than any of the time periods of Table 1, then the AND gate 109 of the wait state generator remains disabled and the DAC WAIT signal is not passed to the control logic 69 and on to the MPU 19 as a READY signal. If two consecutive read or write signals are not separated by the predetermined time period, however, the overlap is detected by circuitry 111, the AND gate 109 is enabled and the DAC WAIT signal is passed on to the control logic 69 which in turn presents the signal to the MPU 19 as a READY signal at its READY input.

When the AND gate is disabled, its output is low. In a conventional manner, the low DAC WAIT signal translates to an active READY signal at the output of the control logic 69 when the video DAC 15 is being addressed. In this regard, the control logic 69 receives wait signal inputs from other devices in the video subsystem as indicated in FIG. 6. Well-known logic in the control logic 69 allows only the wait signal for the device being addressed in the present transfer cycle to pass through the READY line.

Detailed operation of the interface of FIG. 6 is described hereinafter in connection with the timing diagram of FIG. 7. The PIXEL CLOCK is received by a clock input CK of the binary counter 93. When the video DAC 15 is not being addressed, the output of AND gate 95 is inactive; therefore, the inverted input for the reset (RST) of the binary counter 93 is held active and the outputs of the counter are held in a reset condition. In this reset condition, the inverted output (8), indicative of an eighth count, enables the AND gate 97.

When the binary counter 93 is released from the reset condition, it counts pixel clock pulses. When the eighth clock pulse is counted, the AND gate 97 is effectively disabled since the active 8 output is inverted as indicated and provides a logic zero to one of the inputs to the AND gate.

With the foregoing operation of the binary counter 93 in mind, when a transfer cycle is initiated, the $\overline{DAC\ ADDRESS}$ signal from the address decoder 68 (FIG. 2A) goes active (low). Each of the OR gate 87 and 89 receives the $\overline{DAC\ ADDRESS}$ signal at one of its three inputs. The second input receives the MASK DAC R/WR signal from AND gate 97. Shortly thereafter, either the read or write strobe signal, $\overline{IOR}$ or $\overline{IOW}$, goes active (low). Prior to the beginning of a transfer cycle, the MASK DAC R/WR signal is inactive (low), assuming that more than a predetermined time period has passed since the last cycle. During a transfer cycle between the video DAC 15 and the MPU 19, one of the OR gates 87 and 89 will have all three inputs low, resulting in a low input to AND gate 95. The low at AND gate 95 effectively arms the RST input to the binary counter 93, thereby causing the counter to reset and not count the pulses from the PIXEL CLOCK.

Figure 7:
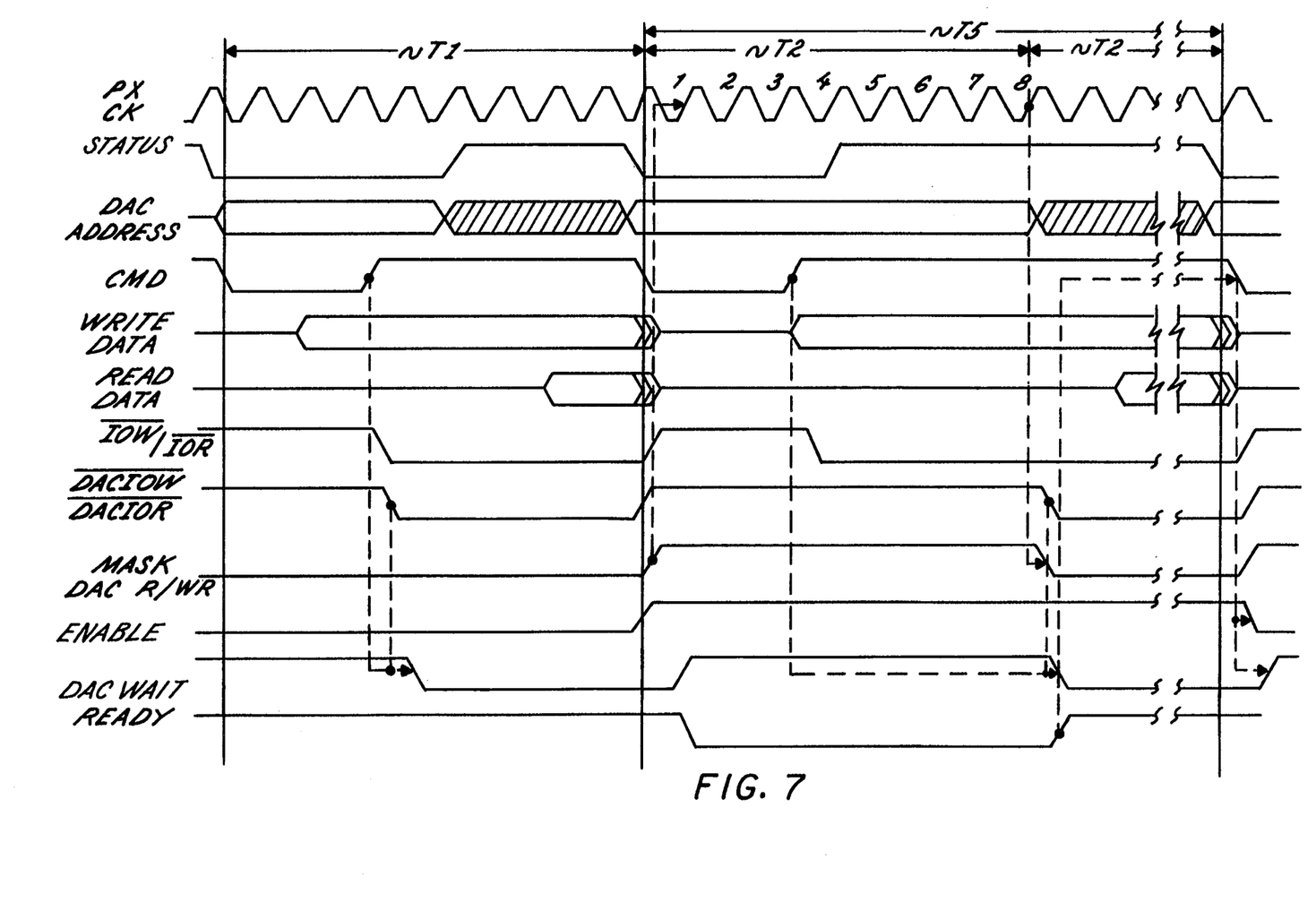
FIG. 7 is a timing diagram illustrating the states of various important input and output lines in the circuitry of FIG. 6 over two consecutive transfer cycles between the CPU and the video subsystem.

With a low input to the AND gate 95, it in turn presents a low input to the AND gate 97 so that the latter gate sets the MASK DAC R/WR signal inactive as indicated in FIG. 7. The $\overline{DAC\ ADDRESS}$ signal (not shown in FIG. 7) essentially lasts the entire transfer cycle, so the timing of the binary counter 93, AND gates 95 and 97 and OR gates 87 and 89 can be considered as controlled by the $\overline{IOW}$ and $\overline{IOR}$ strobe signals. In this regard, when the $\overline{IOR}$ or $\overline{IOW}$ signal goes inactive, a logical "1" or high reappears at all three inputs to the AND gate 95. This high signal disables the RST input of the binary counter 93 and allows the counter to count pulses from the PIXEL CLOCK. The high output of AND gate 95 also enables the AND gate 97 to pass the output from the inverted 8 output of the binary counter 93. From being reset, inverted 8 output of the binary counter 93 is initially at a logic 1 state. Therefore, when the AND gate 97 is enabled as a result of a $\overline{IOW}$ or $\overline{IOR}$ signal going inactive, it passes the logic 1 state of the inverted 8 output line to the MASK DAC R/WR line. An active signal on the MASK DAC R/WR line is effective to disable the OR gates 87 and 89 since their outputs will remain high regardless of the signals present on the $\overline{IOR}$, $\overline{IOW}$ and $\overline{DAC\ ADDRESS}$ lines as long as MASK DAC R/WR is active.

The MASK DAC R/WR line will remain active and the OR gates 87 and 89 disabled while the binary counter 93 counts the pixel clock pulses as indicated by the numbered pixel pulses in FIG. 7. When the eighth pixel pulse is counted, the inverted 8 output of the counter 93 goes low, thereby disabling the AND gate 97 and causing the MASK DAC R/WR line to go inactive. Now the OR gates 87 and 89 are again able to pass $\overline{\text{IOR}}$ and $\overline{\text{IOW}}$ signals if the video DAC is being addressed (i.e., the $\overline{\text{DAC ADDRESS}}$ line is active).

By disabling the OR gates 87 and 89 for a predetermined time period after the end of a $\overline{\text{DACIOW}}$ or $\overline{\text{DACIOR}}$ strobe signal to the video DAC 15, the interface meters the delivery to the video DAC of consecutive read or write strobe signals so that they are always separated-by at least the predetermined time period. The predetermined time period is generated by the binary counter 93 responding to the pixel clock pulses to clock the logic 1 tied to the data input D of the counter.

Referring now more specifically to the timing diagram of FIG. 7, the relevant signals of two consecutive transfer cycles are illustrated. The first and second transfer cycles are time related approximately in the manner schematically illustrated for the first and second cycles in FIG. 4C, meaning that the first transfer cycle is of nominal length (T1), whereas the second is extended (T5) and follows virtually immediately after the first.

In keeping with the invention, after the $\overline{\text{DACIOR}}$ or $\overline{\text{DACIOW}}$ signal goes inactive at the end of the first cycle, the MASK DAC R/WR signal goes active for the predetermined eight (8) pixel clock pulses. During this predetermined time period, the $\overline{\text{IOW}}/\overline{\text{IOR}}$ signal goes active for the second cycle. However, the gates 87 and 89 are disabled and $\overline{\text{DACIOW}}/\overline{\text{DACIOR}}$ is not generated. Instead, it is delayed until MASK DAC R/WR goes inactive after the eighth pixel pulse is counted by the binary counter 93. As can be seen from an inspection of the waveforms in FIG. 7, the second $\overline{\text{IOW}}/\overline{\text{IOR}}$ signal has been effectively waveshaped into a $\overline{\text{DACIOW}}/\overline{\text{DACIOR}}$ signal that is separated by an amount that does not violate any timing parameter of Table 1.

Figure 5:
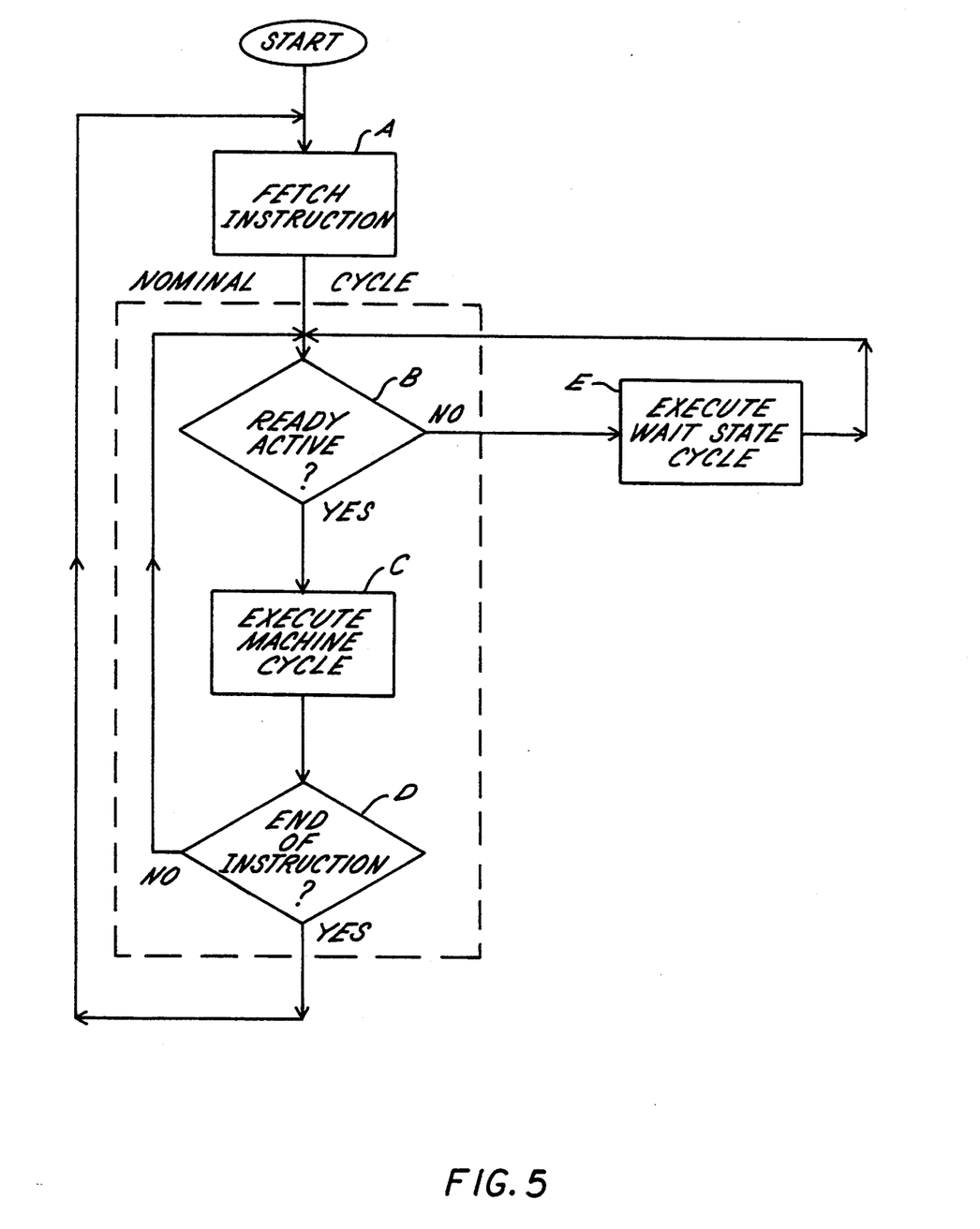
FIG. 5 is a flow diagram illustrating the microprogramming employed by the MPU in conjunction with the invention.

In order to compensate for the delayed delivery to the video DAC 15 of the read/write command of the second transfer cycle, the wait state generator causes the READY line to go inactive, thereby resulting in the MPU 19 inserting wait state machine cycles into the transfer cycle as discussed in connection with the flow diagram of FIG. 5. Immediately after the OR gates 87 and 89 are enabled and the $\overline{\text{IOR}}/\overline{\text{IOW}}$ strobe signal is passed on to the video DAC 15 as $\overline{\text{DACIOR}}/\overline{\text{DACIOW}}$, the READY signal returns to an active state (see FIG. 7) and the MPU 19 returns to executing the machine cycles of the nominal transfer cycle. In this manner, the second transfer cycle is extended by an amount which approximately corresponds to the delay imposed on the $\overline{\text{IOR}}/\overline{\text{IOW}}$ strobe. In this regard, it should be noted that because the $\overline{\text{IOW}}/\overline{\text{IOR}}$ strobe does not immediately go active at the beginning of a cycle, T5 in FIG. 7 does not necessarily approximately equal T1+T2 as suggested in FIG. 4C.

In order to deactivate the READY signal and thereby cause the MPU 19 to insert wait state machine cycles into the transfer cycle, an active DAC WAIT signal must be generated by the sample and delay circuit 99. An active DAC WAIT signal will not be passed onto the control logic 69 for deactivating the READY signal, however, unless the AND gate 109 is enabled. The AND gate 109 is enabled by an active signal at the Q output of a latch 111. The Q output of the latch 111 goes active when a high signal is passed to it from the data input (D) of the latch in response to a low signal at the clock input (CK) of the latch. The CK input receives the CMD control signal. During the beginning of each transfer cycle, the CMD line is inactive or low as can be seen in FIG. 7. In response to the low input at the CK input of the latch 111, the signal at the output of an AND gate 113 is passed from the data input D of the latch 111 to the Q output, and as long as the CK input remains low, the signal at the data input is passed to the Q output. When the CMD line goes active during the transfer cycle, the Q output of the latch 111 holds the last signal passed to it from the data input D.

When the MASK DAC R/WR signal goes inactive and the $\overline{\text{DACIOR}}/\overline{\text{DACIOW}}$ strobe signal is generated in the second transfer cycle, the CMD line is active, releasing the flip-flop 103 from its reset condition. The CMD line is passed to the inverted input (RST) of the flip-flop 103 by AND gate 114. The AND gate 114 is usually enabled since its second input is a RESET command line which is normally high as discussed hereafter. With the command (CMD) line inactive, the flip-flop 103 is now free to clock in data from its D input. In this regard, the NAND gate 101 is enabled since the Q output of the flip-flop 103 is high, and it is one of the inputs to NAND gate 101. The other input to NAND gate 101 is from the output of AND gate 95 which goes low if a $\overline{\text{DACIOR}}/\overline{\text{DACIOW}}$ signal is present. Therefore, when released from its reset condition by the CMD signal, the flip-flop 103 effectively samples the $\overline{\text{DACIOR}}/\overline{\text{DACIOW}}$ lines to detect the presence of an active read/write signal to the video DAC 15. The $\overline{\text{DACIOR}}/\overline{\text{DACIOW}}$ lines are sampled at the frequency of the TIME BASE which may be, for example, 25 MHz.

The releasing of the D flip-flop 103 by the presence of a CMD signal indicates a transfer cycle is in progress. If the active read/write signal has not appeared on the $\overline{\text{DACIOR}}/\overline{\text{DACIOW}}$ lines after the CMD line goes active, the output of AND gate 95 will be high. This high signal will be clocked to the Q output of the flip-flop 103 and then clocked to the Q outputs of the D flip-flops 105 and 107 upon successive pulses of the TIME BASE. The output of the D flip-flop 107 is the DAC WAIT signal, and it will go active in a delayed relationship with the sampling at the flip-flop 103 of the $\overline{\text{DACIOR}}/\overline{\text{DACIOW}}$ line. The delay is intended to ensure the $\overline{\text{DACIOR}}/\overline{\text{DACIOW}}$ have a minimum required width.

The latch 11 and AND gate 113 comprise a circuit 116 for detecting when two consecutive transfer cycles create active signals on the $\overline{\text{IOW}}/\overline{\text{IOR}}$ lines that violate the predetermined minimum separation time of two consecutive read/write strobe signals. When the minimum timing is not violated, the output of AND gate 113 is low, and when the CMD line is inactive, the low output of the AND gate is passed from the data input D of the latch to the Q output, thereby disabling the AND gate 109 and preventing passage of an active DAC WAIT signal. When the minimum timing is violated, however, the output of the AND gate 113 is high and the high is passed to the Q output of the latch 111 when the CMD line is inactive at the beginning of the second cycle as shown in FIG. 7. The Q output holds the high from the AND gate 113 until the CMD line again goes inactive. Referring to FIG. 7, the ENABLE waveform corresponds to the signal which appears at the Q output of the latch 111. As can be seen, the ENABLE signal provides a high for the entire second transfer cycle so that the AND gate 109 passes any active DAC WAIT signal generated during that cycle. In response to the active DAC WAIT signal, passed to the control logic 69, the READY signal goes inactive as indicated by the waveform in FIG. 7 for the READY signal. In contrast to the second cycle, the first cycle is assumed to have begun well after any previous read/write transfer cycle. Therefore, the AND gate remains disabled for the entire cycle and prevents the DAC WAIT signal from passing to the control logic 69.

Turning to the inputs of the AND gate 113, the DAC ADDRESS line and $\overline{S0}$ and $\overline{S1}$ command lines essentially act to selectively enable or disable the gate for passing the MASK DAC R/WR signal to the latch 111. The DAC ADDRESS, $\overline{S0}$ and $\overline{S1}$ lines carry active signals at the beginning of a transfer cycle, and when they are all active they indicate the second transfer cycle is directed to the video DAC 15. In response to this indication, the status of the MASK DAC R/WR line controls the status of the output of the AND gate 113. If the second transfer cycle begins before the expiration of the time period measured by the signal on the MASK DAC R/WR line, all three inputs to the AND gate 113 will be high and the output of AND gate 113 will be high. During the beginning of the transfer cycle, the CMD line is inactive, so that high at the output of AND gate 113 is passed to the Q output of latch 111. As previously explained, the presence of a high signal on the Q output of the latch 111 enables the AND gate 109 to pass an active DAC WAIT signal to the control logic 69. An exclusive OR gate 115 is employed in order to provide a single input to the AND gate 113 which is indicative of the condition of both status lines $\overline{S0}$ and $\overline{S1}$. In this regard, the STATUS waveform in FIG. 7 corresponds to the signal present at the output of the exclusive OR gate 115.

Finally, a $\overline{RESET}$ line is provided for initializing the interface 83 in certain situations such as, for example, power up. An active low on the RESET line resets the binary counter 93 and the D flip-flop 103, causing the DAC WAIT line to assume an inactive initial condition.

From the foregoing detailed description, it will be appreciated that the invention provides a system which ensures compatibility between existing software for a peripheral device and new central processing systems which operate at significantly faster speeds than the systems for which the software was originally designed. For example, read/write instructions to a color palette in a video DAC can be programmed without inserting software delays (e.g., no-op cycles or jump commands) in an attempt to ensure timing parameters are maintained. While ensuring timing parameters are not violated, the interface 83 in the video interface 11 also allows the MPU 19 to execute instructions as fast as the system allows (i.e., the nominal cycle) and slows the system only when needed to prevent violation of timing parameters (i.e., the extended cycle). In this regard, slower systems are not penalized by the invention since the interface 83 causes wait state machine cycles to be inserted into a transfer cycle only when the interface must waveshape a read/write strobe signal so as to re-space it with respect to the preceeding read/write strobe signal.

We claim:

1. A computer system which optimizes processing and input/output throughput while at the same time ensuring reliable transfer of data between a processing unit and associated peripheral devices, said computer system comprising:

a microprocessor unit (MPU) having a clock cycle, the MPU being coupled to a system bus whose bandwidth provides for high-speed nominal transfer cycles;

a peripheral device responsive to read or write signals from the MPU and having a timing parameter requiring a minimum time period to separate presentation to an input to the peripheral device of a second read or write signal following a first read or write signal in consecutive data transfers executed by the MPU and the peripheral device;

a peripheral interface interposed between the MPU and the peripheral device for ensuring the timing parameter of the peripheral device is not violated and delaying an MPU transfer cycle when necessary, said peripheral interface including:

a timing circuit for measuring a time period after the peripheral device receives the first read or write signal, the time period being at least as great as the timing parameter and established by a clock signal having a period established independently with respect to the clock cycle for the MPU; and a synchronization circuit, which is responsive to the timing circuit, for sensing the transmission by the MPU the second read or write signal before the time period associated with the first read or write signal has elapsed and in response, transmitting a signal to the MPU for extending a second transfer cycle associated with the second read or write signal from the MPU; and a bus interface coupling the system bus to the peripheral interface.

2. The computer system as set forth in claim 1 wherein said peripheral interface further includes:

a gating circuit, coupled to said timing circuit, for disabling the input to the peripheral device for the time period.

3. The computer system as set forth in claim 2 wherein said gating circuit comprises:

a logic circuit for a. providing a signal to enable the timing circuit when the logic circuit receives an enable signal associated with the first read or write signal, b. blocking an enable signal to the peripheral device while the timing circuit performs a delay substantially equal to the time period, and c. transmitting an enable signal associated with the second read or write signal after the timing circuit performs the delay.

4. The computer system as set forth in claim 3 wherein a clocking signal for the peripheral device comprises the second clock signal.

5. The computer system as set forth in claim 4 wherein the timing circuit comprises a counter circuit having a counting rate controlled by the second clock signal.

6. The computer system as set forth in claim 5 wherein the peripheral device is a display terminal.

7. The computer system as se fourth in claim 6 wherein the second clock signal comprises a pixel clock signal.

8. The computer system as set forth in claim 1 wherein said synchronization circuit includes an overlap detection circuit for indicating when a leading edge of the second read or write signal is received by the peripheral interface within the time period after the peripheral device receives a trailing edge of the first read or write signal.

9. The computer system as set forth in claim 8 wherein said synchronization circuit includes a sample and delay circuit for indicating that the peripheral device has received the first read or write signal.

10. The computer system as set forth in claim 9 wherein said synchronization circuit includes a logic circuit for transmitting a signal to the MPU to temporarily suspend execution of the data transfer associated with the second read or write signal when the overlap detection circuit indicates the second read or write signal was received by the peripheral interface within the time period after the peripheral interface received the first read or write signal, and the sample and delay circuit indicates that the peripheral device has received the first read or write signal.

11. In a computer system having a source of commands and a peripheral device coupled to the source of commands, the peripheral device having a limited command response time, a method for ensuring an input of the peripheral device receives successive commands at a rate which can be accommodated by the peripheral device while maintaining a desirable throughput for the peripheral device and the source of commands, said method comprising the steps of:
  transmitting by the source of commands to an interface disposed between the source of commands and the input of the peripheral device a first command for the peripheral device;
  forwarding by the interface the first command to the peripheral device;
  masking by the interface the input of the peripheral device for a time period established by a timing circuit, to ensure that a timing parameter of the peripheral device is not violated, the timing circuit having a clock signal independent of a clock signal for the source of commands;
  transmitting by the source of commands to the interface and second command within the time period;
  transmitting by the interface to the source of commands a ready signal after the expiration of the time period; and
  inserting wait states by the source of commands to temporarily delay execution of the second command until the source of the commands receives the ready signal from the interface.

12. A method as set forth in claim 11 further including the step of:
  receiving by the peripheral device the second command after the expiration of the time period associated with the first command.

13. A method as set forth in claim 12 wherein the time period is on the order of the pre-charge time between the end of a read/write strobe for the first command and the beginning of a read/write strobe for the second command required by a video digital to analog converter (DAC).

14. A method as set forth in claim 13 wherein a clock signal for the peripheral device comprises the second clock signal.

15. A computer system providing enhanced input/output throughput and maintaining reliable transfer of data on a bus between a processor having a clock cycle and a set of one or more peripheral devices, said computer system including:
  a peripheral device responsive to read or write signals and having a timing parameter requiring a minimum time period to separate presentation to an input to the peripheral device of a second read or write signal following a first read or write signal in consecutive data transfers executed by the peripheral device;
  a peripheral interface interposed between the peripheral device and the bus for ensuring the timing parameter of the peripheral device is not violated and delaying an MPU transfer cycle when necessary, said peripheral interface including:
    a timing circuit for measuring a time period after the peripheral device receives a first read or write signal, the time period being at least as great as the timing parameter and established by a clock signal having a period established independently with respect to the clock cycle for the processor; and
    a synchronization circuit, which is responsive to the timing circuit, for sensing the transmission by a source the second read or write signal before the time period associated with the first read or write signal has elapsed and in response, transmitting a signal to the source of the second read or write signal for extending a second transfer cycle associated with the second read or write signal from the source; and
  a bus interface coupling the bus to the peripheral interface.

16. The computer system as set forth in claim 15 wherein said peripheral interface includes:
  a gating circuit, coupled to said timing circuit, for disabling the input to the peripheral device for the time period.

17. The computer system as set forth in claim 16 wherein said gating circuit comprises:
  a logic circuit coupled to the delay circuit for
    a. providing a signal to enable the timing circuit when the logic circuit receives an enable signal associated with the first read or write signal,
    b. blocking an enable signal to the peripheral device while the timing circuit performs a delay substantially equal to the time period, and
    c. transmitting an enable signal associated with the second read or write signal after the timing circuit performs the delay.

18. The computer system as set forth in claim 17 wherein a clocking signal for the peripheral device comprises the second clock signal.

19. The computer system as set forth in claim 18 wherein the timing circuit comprises a counter circuit having a counting rate controlled by the second clock signal.

20. The computer system as set forth in claim 19 wherein the peripheral device is a display terminal.

21. The computer system as set forth in claim 20 wherein the second clock signal comprises a pixel clock signal.

22. The computer system as set forth in claim 16 wherein said synchronization circuit includes an overlap detection circuit for indicating when a leading edge of the second read or write signal is received by the peripheral interface within the time period after the peripheral device receives a trailing edge of the first read or write signal.

23. The computer system as set forth in claim 22 wherein said synchronization circuit includes a sample and delay circuit for indicating that the peripheral device has received the first read or write signal.

24. The computer system as set forth in claim 23 wherein said synchronization circuit includes a logic circuit for transmitting a signal to temporarily suspend execution of the data transfer associated with the second read or write signal when the overlap detection circuit indicates the second read or write signal was received by the peripheral interface within the time period after the peripheral interface received the first read or write signal, and the sample and delay circuit indicates that the peripheral device has received the first read or write signal.

* * * * *